US011509659B2

(12) United States Patent
Liu et al.

(10) Patent No.: US 11,509,659 B2
(45) Date of Patent: Nov. 22, 2022

(54) CONTEXT-BASED AUTOMATED TASK PERFORMANCE FOR USER CONTACTS

(71) Applicant: AT&T Intellectual Property I, L.P., Atlanta, GA (US)

(72) Inventors: Zhu Liu, Marlboro, NJ (US); Paul Triantafyllou, Summit, NJ (US); Eric Zavesky, Austin, TX (US); Bernard S. Renger, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 190 days.

(21) Appl. No.: 16/134,607

(22) Filed: Sep. 18, 2018

(65) Prior Publication Data
US 2020/0092293 A1   Mar. 19, 2020

(51) Int. Cl.
*H04L 9/40* (2022.01)
*G06F 16/9535* (2019.01)

(52) U.S. Cl.
CPC ........ *H04L 63/102* (2013.01); *G06F 16/9535* (2019.01)

(58) Field of Classification Search
CPC ... H04L 63/102; G06F 16/9535; G06F 3/167; G06Q 40/02; G06Q 10/10; G10L 15/22; G10L 15/02; G10L 15/30; G10L 17/22; G10L 2015/223
See application file for complete search history.

(56) References Cited

U.S. PATENT DOCUMENTS

| | | | |
|---|---|---|---|
| 5,493,692 | A  | 2/1996 | Theimer et al. |
| 6,771,756 | B1 | 8/2004 | Chou et al. |
| 8,761,403 | B2 | 6/2014 | Su et al. |
| 8,898,219 | B2 | 11/2014 | Ricci |
| 8,909,693 | B2 | 12/2014 | Frissora et al. |
| 8,959,030 | B2 | 2/2015 | Ricci |
| 9,172,747 | B2 | 10/2015 | Walters et al. |
| 9,703,943 | B2 | 7/2017 | Saraf et al. |
| 9,729,592 | B2 | 8/2017 | Slayton et al. |
| 9,753,990 | B2 | 9/2017 | Novotny et al. |
| 9,804,820 | B2 | 10/2017 | Quast et al. |

(Continued)

FOREIGN PATENT DOCUMENTS

| | | |
|---|---|---|
| WO | 0150387 A1 | 7/2001 |
| WO | 03073417 A2 | 9/2003 |
| WO | 2016090326 A1 | 6/2016 |

OTHER PUBLICATIONS

Horcher, Ann-Marie, "A Cue is worth a 1000 resets: Using Google Assistant to Remember Passwords," USENIX Symposium on Usable Privacy and Security (SOUPS) 2018, pp. 1-5.
(Continued)

*Primary Examiner* — Philip J Chea
*Assistant Examiner* — Sangseok Park (57) ABSTRACT

A processing system including at least one processor may receive a task request for a user from a requesting party, identify a trust profile for the requesting party, identify a first automated system to access to fulfill the task request, determine whether the trust profile for the requesting party permits an access to the first automated system, and fulfill the task request via the first automated system when it is determined that the trust profile for the requesting party permits the access to the first automated system.

20 Claims, 3 Drawing Sheets

(56) References Cited

U.S. PATENT DOCUMENTS

| | | |
|---|---|---|
| 9,830,044 B2 | 11/2017 | Brown et al. |
| 10,003,943 B2 | 6/2018 | Lu et al. |
| 10,339,957 B1* | 7/2019 | Chenier ................ G10L 25/48 |
| 10,580,405 B1* | 3/2020 | Wang ..................... G10L 17/22 |
| 2008/0247529 A1 | 10/2008 | Barton et al. |
| 2014/0047001 A1* | 2/2014 | Phillips ................ H04L 65/403 |
| | | 709/202 |
| 2015/0163341 A1 | 6/2015 | Skovron et al. |
| 2017/0012981 A1* | 1/2017 | Obaidi .................... H04L 63/20 |
| 2017/0024375 A1 | 1/2017 | Hakkani-Tur et al. |
| 2017/0148073 A1 | 5/2017 | Nomula et al. |
| 2017/0289168 A1 | 10/2017 | Bar et al. |
| 2018/0082683 A1 | 3/2018 | Chen et al. |
| 2018/0099644 A1* | 4/2018 | Abou Mahmoud ....................... |
| | | B60R 25/2018 |
| 2018/0159805 A1 | 6/2018 | Jones |
| 2018/0191860 A1 | 7/2018 | Ghafourifar et al. |
| 2018/0234545 A1 | 8/2018 | Barak et al. |
| 2019/0171845 A1* | 6/2019 | Dotan-Cohen ....... H04L 63/102 |

OTHER PUBLICATIONS

Bree, Francisco Gonzalez, et al., "The Case of Fifth Generation Virtual Assistants," Sep. 2012, The 7th European Conference on Entrepreneurship and Innovation, Santarem, Portugal, pp. 1-11.

Le, A., et al., "Automatic Classification of Mobile Phone Contacts," Mensch & Computer 2013—Tagungsband: 13. fachubergreifende Konferenz fur interaktive und kooperative Medien. Walter de Gruyter, 2013, pp. 1-10.

* cited by examiner

CONTEXT-BASED AUTOMATED TASK PERFORMANCE FOR USER CONTACTS

The present disclosure relates generally to virtual assistants, and more particularly to fulfilling a task request for a requesting party on behalf of a user based upon context data and a trust profile of the requesting party.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses processing systems, devices, non-transitory (i.e., tangible or physical) computer-readable storage media, and methods for fulfilling a task request for a user from a requesting party. For instance, in one example, a processing system including at least one processor may receive a task request for a user from a requesting party, identify a trust profile for the requesting party, identify a first automated system to access to fulfill the task request, determine whether the trust profile for the requesting party permits an access to the first automated system, and fulfill the task request via the first automated system when it is determined that the trust profile for the requesting party permits the access to the first automated system.

Users often cannot attend to text messages, emails, cell phone alerts, video calls, or meeting requests (either voice or text) because they are busy with other things or cannot be disturbed, such as driving a car, on an airplane, in a meeting or movie, sleeping, and so on. The purpose of others contacting a user may extend far beyond simply text or location queries. The contact may have a request that requires user attention, lookup of specific data, or granting access or privileges that are not easily done with a single click.

Examples of the present disclosure relate to a personal virtual agent (e.g., a service running on network-based and/or personal computing devices) that automatically addresses task requests from requesting parties so as to perform one or more actions in accordance with the task requests, such as: retrieving and/or providing information, executing a sequence of computing operations, engaging one or more remotely-controllable devices, interacting with other automated devices and/or services, obtaining an access to a location, device, or service, and so forth.

To illustrate, a child may be at school waiting for a pickup from a parent and may send a text message to the parent inquiring as to where the parent is currently located and/or how long until the parent will arrive. The parent may be driving and cannot immediately send a text message back. However, the parent may want the child to know his or her current location or how long it will take for the parent to arrive. Examples of the present disclosure may automatically intervene on behalf of the parent to address this task request from the child. In another example, a first spouse may call a second spouse for a home network password to give to a guest or to setup a new device. The second spouse may be in a work meeting and cannot take the call. In this case, examples of the present disclosure may also automatically intervene on behalf of the second spouse to address this task request from the first spouse.

In one example, a virtual assistant may be authorized by a user to perform actions in response to task requests, such as accessing personal information, accounts, passwords, or the like, locking and unlocking doors and windows, providing and/or revoking access to a computing device, program, or network, providing media content from a device or network, and so on, in accordance with a set of rules for different requesting parties or classes of requesting parties, different trust profiles, and/or different contexts. For instance, a user may assign a first trust profile to a spouse, a second trust profile to children, a third trust profile to extended family (e.g., grandparents, aunts, uncles, brother and sister in-laws, and so on), a fourth trust profile to work colleagues, a fifth trust profile to certain service providers, such as a telecommunications service provider, a doctor, a mechanic, etc., and so on. These different trust profiles may be associated with different permissions to access information or perform other actions relating to different automated systems that may be enrolled by a user for access by the virtual assistant. In addition, different contexts may include time of day, day of week, duration of unavailability of the user, availability of another live proxy for the user, user location, requesting party location, presence of others with the requesting party, a computing device being used by the requesting party to submit a task request, and so on. Similarly, these different contexts may be associated with different permissions to access information or perform other actions relating to different automated systems that may be enrolled by a user for access by the virtual assistant. For instance, a requesting party may have a trust profile that grants access to a user's banking information between the hours of 9 AM to 5 PM, but that may deny access to the same banking information outside of these hours. In one example, trust profiles for contacts/requesting parties can be specified manually or learned from historical conversations, chats, and other personal information, such as calendar information, social media connections and/or activity, and so on.

In an illustrative example, a user may first setup a virtual assistant which may operate on one or more personal devices of the user and/or via a network-based processing system. The virtual assistant may query for contacts of the user from the user's contact list(s), phone calls, text messages, emails, social media service(s), and so forth in accordance with the consent of the user. Alternatively, or in addition, the virtual assistant may determine contacts of the user via manual input from the user. In one example, the virtual assistant may initially assign trust profiles to different contacts based on the respective types of social connections between the user and the contacts, e.g., spouse, parent, child, other relative, co-worker, friend, known merchant or service provider, unknown, etc.

As part of the setup of the virtual assistant, the user may also enroll and opt-in to allow access to one or more automated systems associated with the user. The automated systems may include a calendar system, a contact management system, a banking system, a computing system (e.g., a personal computing device, server, and/or cloud computing platform with algorithms, user interfaces, applications, etc.), a communication system, (e.g., a cell phone, a home phone, a softphone, a wireless router, a wireless network, a cable television, a video on demand service (VOD) a digital video recorder (DVR), or the like, an Internet access service, etc.), a smart building system, a biometric measurement system, a document management system, a location information system, a vehicle, and so on. The automated systems may operate on one or more personal devices of the user. The automated systems may alternatively or additionally comprise one or more network-based devices. The automated systems may store personal data relating to the user, such as biometric information of the user, demographic, income, employment, and/or housing information of the user, documents, photographs, or videos of the user, and so forth. In one example, the automated systems may also provide computing services, such as software applications owned or licensed by the user. In addition, the automated systems may include devices which control physical access, such as an automated lock, an automated door or window, and so forth.

In one example, a trust profile may include rules defining which automated system(s) may be accessed by the virtual assistant for a contact/requesting party and in which context(s). In one example, a user may manually alter a trust profile for a contact/requesting party. For instance, default trust profiles may initially be assigned to different contacts, but the user may have a preference to make sure that a particular contact is able to access a particular automated system or to make sure that the particular contact is unable to access a particular automated system. In one example, the virtual assistant may also learn the preferences and habits of the user and may adjust trust profiles for various contacts over time and over various observed events.

In one example, a user may activate a virtual assistant manually, e.g., by providing an input indicating that the user is now unavailable or will be unavailable in a given time period. Alternatively, or in addition, the virtual assistant may monitor context(s) relating to the user to determine a time during which the user is unavailable and to intercept task requests from contacts/requesting parties on behalf of the user. For example, in accordance with the consent of the user, the virtual assistant may operate in a standby mode, reviewing the calendar information of the user and determining that the user is in a meeting between the hours of 3:00 PM and 4:00 PM. Thus, the virtual assistant may determine to make itself active during this time period. In one example, the virtual assistant may also determine to revert to a standby mode after this time period. Similarly, in accordance with the consent of the user, the virtual assistant may monitor the connections to the user's mobile computing device and determine that the mobile computing device has a near-field communication (NFC) connection to a vehicle-based computing system. As such, the virtual assistant may determine that the user is driving (e.g., using location information such as global positioning system (GPS) data indicating the user's mobile computing device is in motion, based on user input that the user is currently driving, or simply by virtue of its connection to vehicle-based computing system, and so on) and is therefore unavailable. In this case, the virtual assistant may also determine to change to an active mode and handle incoming task requests from the user's contacts and/or other requesting parties. When the virtual assistant is "active," context information of the user may be periodically sent to and/or collected by the virtual assistant. Alternatively, or in addition, the virtual assistant may await an incoming task request and may obtain context information in response to receiving such a new task request.

In an illustrative example, the virtual assistant may receive an incoming task request from the user's spouse for a personal password (e.g., a wireless network password, a shared bank account password, etc.). The virtual assistant may determine that the user is in a do-not-disturb session (e.g., driving a vehicle, in a meeting, at a client site, etc.) by virtue of the virtual assistant being manually placed in active mode, or by reviewing collected context information indicating that the user is currently busy. The virtual assistant may then identify any automated systems which are required to fulfill the task request and determine whether the trust profile of the spouse authorizes access to the automated system(s). In one example, the virtual assistant may determine that the spouse is authorized to access a banking service and may provide the password. In another example, the virtual assistant may determine that the spouse is authorized to access the banking service, but may not necessarily provide the password. Instead, the virtual assistant may access the banking service via a computing device being used by the spouse. For example, the spouse may be using a shared device, e.g., a personal computing device at the spouses' home.

In another example, a child may request a wireless network password. The virtual assistant may determine that the trust profile of the child does not allow access to the password in the current circumstances (e.g., at the current time, while the child is alone, etc.) and may provide a response to the child (e.g., via a computing device being used by the child). In one example, the virtual assistant may also send a non-obtrusive notification to the user, such as a text message or an application alert. In one example, if the user is able to attend to the alert, the user may provide an authorization to override the decision of the virtual assistant to reject the task request. However, if the context is different (e.g., the child is with friends and indicates a need for homework) the trust profile may indicate that the child should be given access to the password. Accordingly, the virtual assistant may provide the password to the child. Alternatively, the virtual assistant may determine that it may provide access to the wireless network, without specifically giving the password to the child, by establishing a session between a computing device being used by the child and a router providing the network access. For instance, the child may be using a shared device, e.g., a personal computing device at the family home. Notably, sensitive information may be better protected when the virtual assistant engages another automated system rather than the requesting party. For instance, the child does not need the actual password, only approval to use it, and the virtual assistant may handle the actual session setup to bring about the access by the child.

In still another example, where the virtual assistant initially determines that access is not authorized to one or more automated systems and that the task request cannot be automatically fulfilled, the virtual assistant may submit the task request to an authorized proxy for the user. For instance, the request may be handled by the virtual assistant for a first parent, which may reject the request. However, the first parent may also configure the virtual assistant to allow a second parent to authorize or deny task requests on his or her behalf. Thus, the virtual assistant may send a notification to the second parent with an option to override the decision of the virtual assistant.

In one example, when the user exits a do-not-disturb situation, the user can review the virtual assistant's actions and provide feedback to help guide future decision-making. For instance, the user may be given an option to authorize all future password requests (or requests of similar nature) from this particular child and/or from all of the user's children. In one example, the user may also specify an additional action or trigger that the virtual assistant may add as an option in a workflow (e.g., to query additional database(s), solicit information from the requesting party, demand that the virtual assistant obtain user assent for certain task requests or portions of task requests, and so on). The virtual assistant may then update its configuration for future responses in accordance with the user feedback. In one example, the virtual assistant may be updated on a semi-regular basis in accordance with the experiences of various virtual assistants for various users. For instance, a global service may learn what most users are doing for similar social connections and update default policies for new contacts and/or those with default settings.

As another example, a manager or supervisor may engage a virtual assistant to handle task requests from the manager's reporting personnel. As in the examples above, context information can be periodically sent to or collected by the virtual assistant, or provided on demand when new task requests are received. In one example, a task request may be a request for authorization for increased spending by a remote worker. In another example, a task request may be for accessing a video about a new product that the remote worker would like to show while the remote worker is on-site with a client. In still another example, a task request may be for a remote worker to access a technical asset (e.g., turn on an expensive machine, open a vehicle, operate the vehicle, run a particular software application, such as a diagnostic test, a demonstration, etc., and so on). With regard to each of these types of task requests, the virtual assistant may approve, reject, or escalate based on the remote worker's trust profile and based on context such as location, desired action by remote technician, known current activity, presence of others, date, time, and so on.

In one example, the virtual assistant may determine that the remote worker should be granted access to the video and may stream the video to a computing device of the remote worker, may provide an access password for the remote worker to download and or activate the video, may instruct a content server to transmit the video to the device of the remote worker, and so on. In one example, the virtual assistant may apply a sensitive information redaction application to the video before allowing the access by the remote worker. For instance, the user (the supervisor/manager) may configure a workflow for the virtual assistant to always apply the sensitive information redaction application for all requesting parties, specific requesting parties, and/or a class of requesting parties, for specific trust profiles, etc.

In one example, the trust profile of the remote worker may indicate that increased spending or access to a discretionary account with more funds should be allowed in a first context (e.g., known location, validation of proximity to customer, etc.), while in a second context the task request should be rejected (e.g., indicated cost over a threshold amount, unusual or unknown location, location not on a list of preapproved locations, late at night instead of business hours or just after business hours, time zone does not match worker's service area, and so forth). In one example, where a task request is rejected, the request may be escalated to the supervisor via a message or notification to a device of the supervisor, or by an in-service alert via the virtual assistant. For example, the supervisor may be given an interactive dialog via a visual user interface or interactive voice response (IVR) where the supervisor can confirm or reject the decision of the virtual assistant, initiate a call or message to the remote worker to obtain more information, and so on. If the supervisor authorizes the request, the virtual assistant may also solicit feedback as to whether the user wants to change the trust profile of the remote worker, e.g., to change the context(s) for which future task requests of a similar nature should be approved, e.g., allowing access to increased funds over a greater geographic area and/or over a greater time range, allowing access to greater funds, and so on.

In one example, even when the virtual assistant fulfills the task request (such as allowing access to increased funds), the virtual assistant may continue to monitors spending and accessing of the account, to alert the supervisor or prevent run-away usage. In addition, in one example, higher-level users may also have authority to monitor the virtual assistant's decisions, as well as any user overrides, and may nullify individual trust escalations. In one example, the virtual assistant reviews and audits decision making with feedback from the supervisor, learns context-dependent responses, and learns to adjust remote worker's trust profiles (e.g., promoting or demoting access permissions for specific automated systems) based on the supervisor audit. Similar to the examples above, the virtual assistant may be updated on a semi-regular basis in accordance with the experiences of various virtual assistants for various users. For instance, a global service may learn what most users are doing for similar social connections and update default policies for new contacts and/or those with default settings.

In one example, the present disclosure may incorporate enhanced verification and authentication of requesting parties' identities for certain types of task requests (e.g., instructing the requesting party to perform a gesture or user-specific act, reducing chances of remote spoofing). General task requests may be handled without such enhanced verification, but those that are to access information deemed more sensitive by the user, or which result in physical access to a device or premises may utilize additional authentication actions or include an additional layer of approval from the user. In another example, a virtual assistant may be designated by a user to handle task requests from other virtual assistants or automated systems. For instance, a medical service provider may send an automated request for the user to provide biometric information (including heart rate, blood pressure, pill taken status, etc.). In accordance with the present disclosure, the virtual assistant may intercept the request (e.g., a "task request"), determine the identity of the requesting party (e.g., an authenticated device or system associated with the medical service provider), determine that the requesting party is authorized for access to the automated system(s) having the information requested, obtain the information from the automated system(s) (e.g., a heart rate monitor, a glucose monitor, a pedometer, a user's mobile computing device which may aggregate information from other biometric devices, and so forth), and provide the information to the authenticated device or system associated with the medical service provider.

Examples of the present disclosure may also include the use of sensory information to improve the decision-making capabilities of the virtual assistant. For instance, sensor information may provide additional context for the user, such as biometric data comprising a heart rate, a running or cycling speed, a stress level, and so forth), which may be used individually as new data points, or to verify other context information, such as confirming schedule information indicating that the user is to be exercising during a given time period. In another example, a first virtual assistant of a first user may interact with a second virtual assistant of a second user to exchange information, plan for an event, negotiate a deal, etc. in accordance with the respective trust profiles assigned to the first user by the second user, and vice versa. In still another example, the response format/content provided to a requesting party may also be determined by the context(s) of the session. For instance, if there are others detected to be present with a requesting party, even if the virtual assistant is authorized to fulfill a task request (e.g., obtaining and providing information) for the requesting party, the virtual assistant may select to provide a response via a text message, rather than a voice response, so as to avoid the others nearby from overhearing the information. The others may be detected in any number of ways, such as a voice recognition application on a device of the requesting party identifying more than one distinct voice, via image analysis from a video, frames of a video, or digital photograph identifying multiple people, or by identifying the requesting party and detecting one or more additional known or unknown people, and so on.

Examples of the present disclosure therefore provide a controlled, efficient, and secure way to share information, provide access, and execute other tasks for users and their contacts via network-based systems. In addition, the users do not need to specifically setup the rules on how and with whom to share certain information, since the virtual assistant learns such rules through historical communication data and other information (e.g., the relationship between the users and their contacts). Examples of the present disclosure improve user safety since users do not need to respond to calls when driving or in other situations which require their full attention. Such a system also saves time and effort for requesting parties contacting a user, since the requesting parties, when authorized, may be able to obtain desired information in a timely manner without attempting to call the customers again and again. These and other aspects of the present disclosure are discussed in greater detail below in connection with the examples of FIGS. 1-3.

Figure 1:
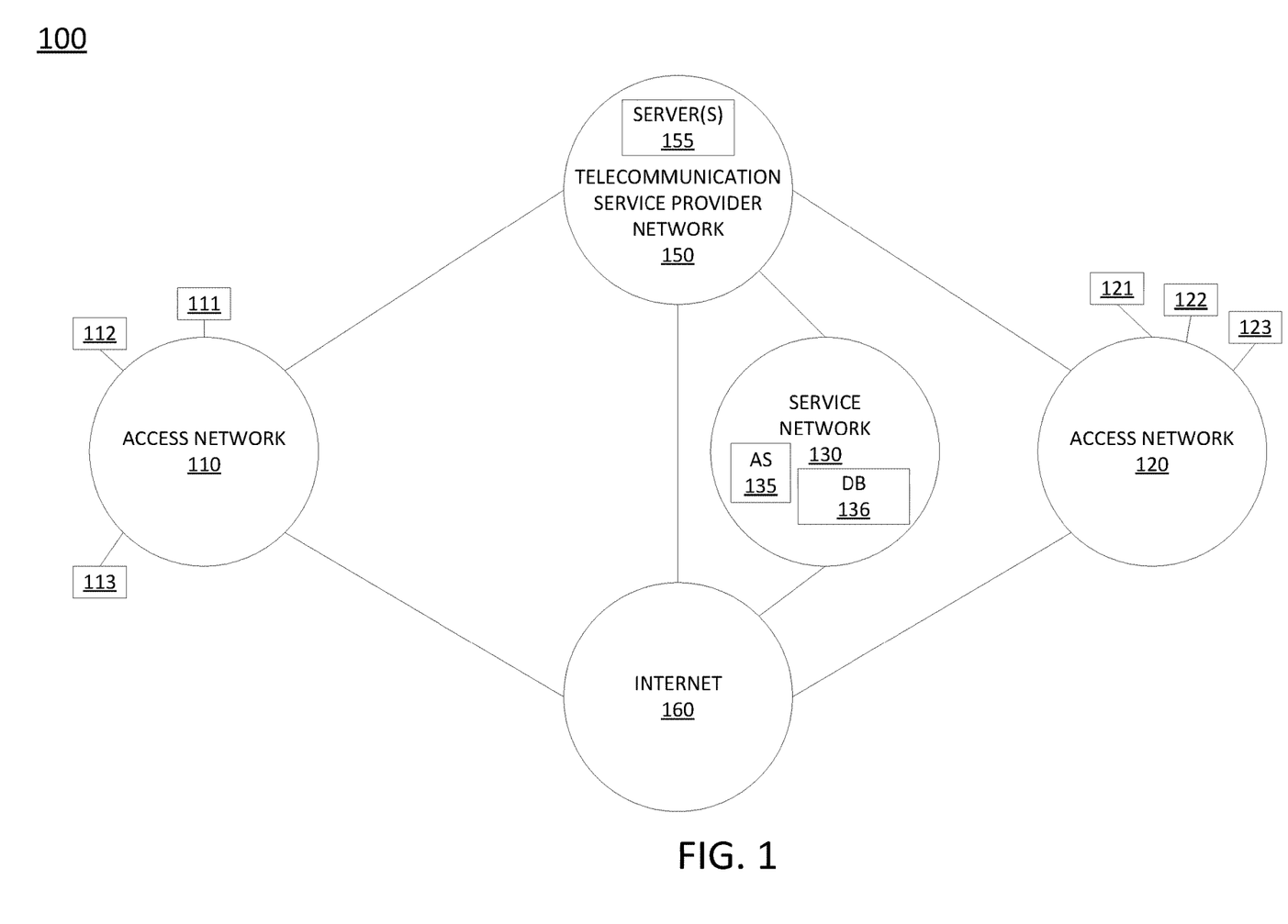
FIG. 1 illustrates one example of a system including a telecommunication service provider network, according to the present disclosure.

To aid in understanding the present disclosure, FIG. 1 illustrates an example system 100 comprising a plurality of different networks in which examples of the present disclosure for fulfilling a task request for a user from a requesting party may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing system, such as computing system 300 depicted in FIG. 3, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. Other centralized system components may include, for example, a layer 3 router, a short message service (SMS) server, a voicemail server, a video-on-demand server, a server for network traffic analysis, and so forth. It should be noted that in one example, a centralized system component may be hosted on a single server, while in another example, a centralized system component may be hosted on multiple servers, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113 and 121-123, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile computing device, such as a cellular smart phone, a laptop, a tablet computer, etc., a router, a gateway, a desktop computer, a plurality or cluster of such devices, a television (TV), e.g., a "smart" TV, a set-top box (STB), and the like. In accordance with the present disclosure, any of endpoint devices 111-113 or 121-123 may also comprise a network communication-enabled device such as: a vehicle (e.g., both self-driving and non-self-driving), "smart glasses" or a "smart watch," a biometric sensor or wearable sensor device, an environmental sensor, a thermostat, a door or window lock, an automatic door opener or window opener, an autonomous drone, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network functions, e.g., of a public land mobile network (PLMN)-universal mobile telecommunications system (UMTS)/General Packet Radio Service (GPRS) core network, or the like.

In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively. In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and or users. For example, telecommunication service provider network 150 may provide a cloud storage service, web server hosting, and other services. As such, service network 130 may represent aspects of telecommunication service provider network 150 where infrastructure for supporting such services may be deployed. In another example, service network 130 may represent a third-party network, e.g., a network of an entity that provides a virtual assistant service, in accordance with the present disclosure.

In the example of FIG. 1, service network 130 may include an application server (AS) 135. In one example, AS 135 may comprise all or a portion of a computing device or system, such as computing system 300, and/or processing system 302 as described in connection with FIG. 3 below, specifically configured to perform various steps, functions, and/or operations for fulfilling a task request for a user from a requesting party. For instance, AS 135 may provide network-based virtual assistants for various users. In another example, AS 135 may comprise a network-based platform providing supporting services to virtual assistants operating on user-controlled devices (e.g., users' mobile computing devices, personal computers, or the like). In still another example, a virtual assistant may comprise components distributed among AS 135 and a user's mobile computing device(s) which work together in a coordinated manner to provide the functions of the virtual assistant as described herein.

In one example, service network 130 may also include a database (DB) 136, e.g., a physical storage device integrated with AS 135 (e.g., a database server), or attached or coupled to the AS 135, to store various types of information in support of systems for fulfilling a task request for a user from a requesting party, in accordance with the present disclosure. For instance, DB 136 may store for each user: lists of automated systems enrolled by the user, trust profiles for the user's contacts/requesting parties, which may include rules for accessing automated systems in various contexts, rules regarding customized actions to take in response to different types of task requests, lists of devices and systems accessible for determining context(s), passwords, drivers, and rules for accessing these devices and systems, information regarding designated proxies of the user, rules for forwarding task requests to one or more designated proxies in connection with particular types of tasks requests, specific trust profiles, specific contacts or classes of contexts, etc., user feedback information regarding previous decisions of the user's virtual assistant, and so forth. In one example, AS 135 and/or DB 136 may comprise cloud-based and/or distributed data storage and/or processing systems comprising one or more servers at a same location or at different locations. However, for ease of illustration, these components are depicted as standalone devices in FIG. 1.

Figure 3:
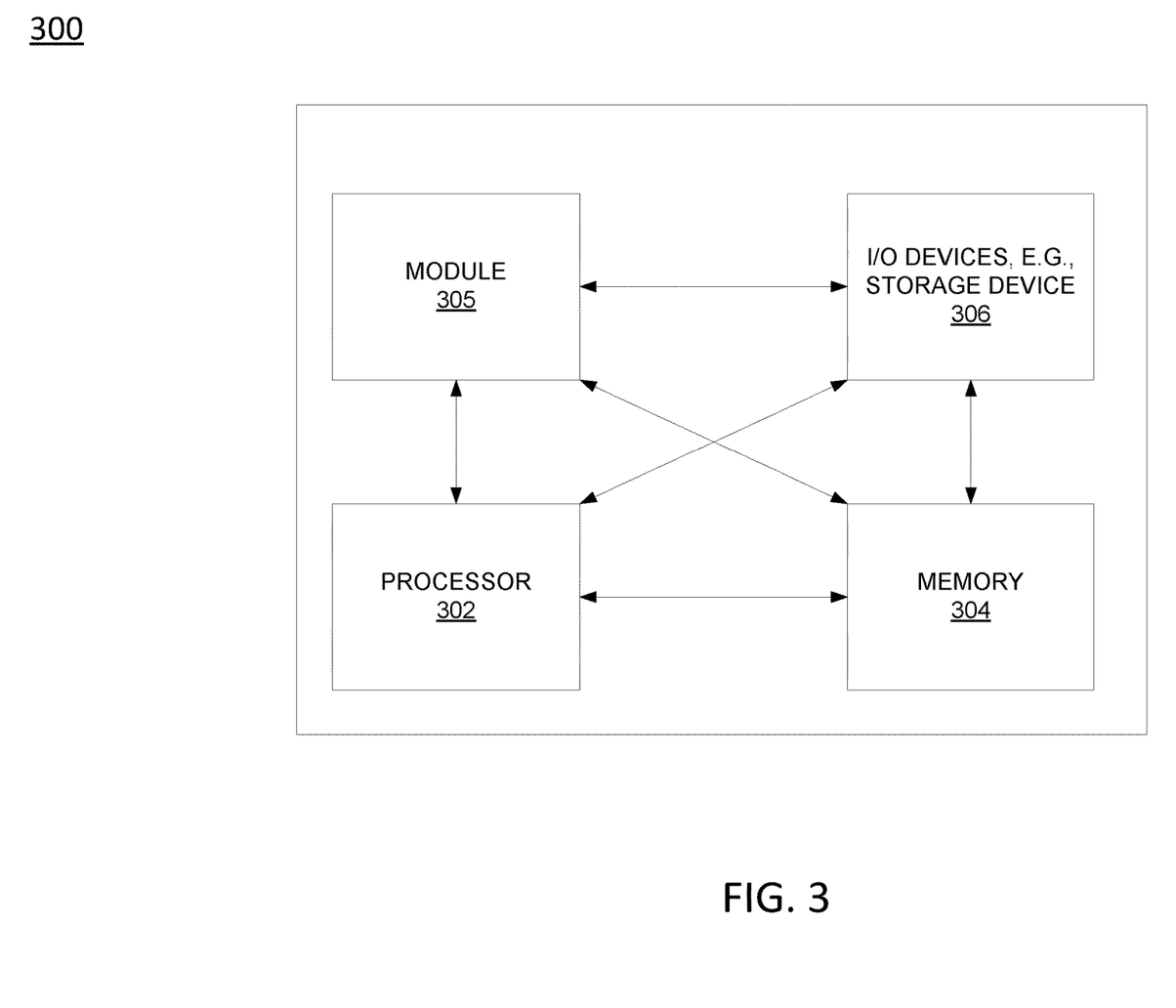
FIG. 3 illustrates a high-level block diagram of a computing device specially programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, a processing system may comprise multiple computing devices in access networks 110 and/or 120, in service network 130, in another network connected to Internet 160 (e.g., a cloud computing provider), and so forth.

In an illustrative example, endpoint device 111 may be a device of a user, and endpoint device 123 may be a device of a contact/requesting party submitting a task request to the user. The task request may be intercepted by the user's virtual assistant operating on AS 135, endpoint device 111, and/or one or more other devices of the user, depending upon the particular configuration of the virtual assistant. The task request may be to obtain information, such as the user's availability later in the day, an account password for a banking service, and so forth. In such an example, the banking service may be represented by one of endpoint devices 112, 113, 121, or 122. The virtual assistant may determine that the information is stored by at least one automated system, such as one of servers 155 storing the user's scheduler/calendar information, or the user's endpoint device 111, which may include a calendar system storing the same or similar information, and so on. The virtual assistant may determine that the requesting party is authorized to access the automated system in accordance with a trust profile of the requesting party, and may retrieve the information and provide the information to the endpoint device 123 of the requesting party. In the case of banking information, the requesting party may then use the information to access a banking service, e.g., via one of the endpoint devices 112, 113, 121, or 122.

In another example, the task request may be to access a telecommunication service. The task request may be similarly intercepted by the user's virtual assistant operating on AS 135, endpoint device 111, and/or one or more other devices of the user, depending upon the particular configuration of the virtual assistant. The virtual assistant may determine the requesting party is authorized to access the telecommunication service in accordance with a trust profile of the requesting party. In one example, the virtual assistant may then retrieve and provide a wireless network access password, if the task request is to provide the password. In another example, the virtual assistant may provide a temporary access token or key to the endpoint device 123 of the requesting party which may be used to connect to the telecommunication service. For example, the virtual assistant may operate on AS 135 and may be managed by the operator of telecommunication service provider network 150. Thus, the virtual assistant may be permitted to take such actions in accordance with the consent of the user and the configuration of the virtual assistant as provided by the user, as well as with the consent of the telecommunication service provider. For example, endpoint device 123 may be authorized to connect to telecommunication service provider network 150 in accordance with a family service plan. However, the user (e.g., an account owner, such as a parent), may voluntarily restrict the ability of endpoint device 123 (e.g., a device given to a child) to utilize certain network connections unless certain criteria (context(s)) are met. Thus, for instance, a provider edge router may reject connections from endpoint device 123 unless authorized by the account holder. However, this authorization may be requested and provided from the virtual assistant on behalf of the user in accordance with the present disclosure.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, the system 100 may further include sensor devices in communication with one or more of the endpoint devices 111-113 and/or 121-123, in communication with access networks 110 and 120, and so forth. In another example, access networks 110 and 120 may represent multiple access networks in communication with each other and in communication with Internet 160 and/or telecommunication service provider network 150. Thus, these and other modifications are all contemplated within the scope of the present disclosure.

Figure 2:
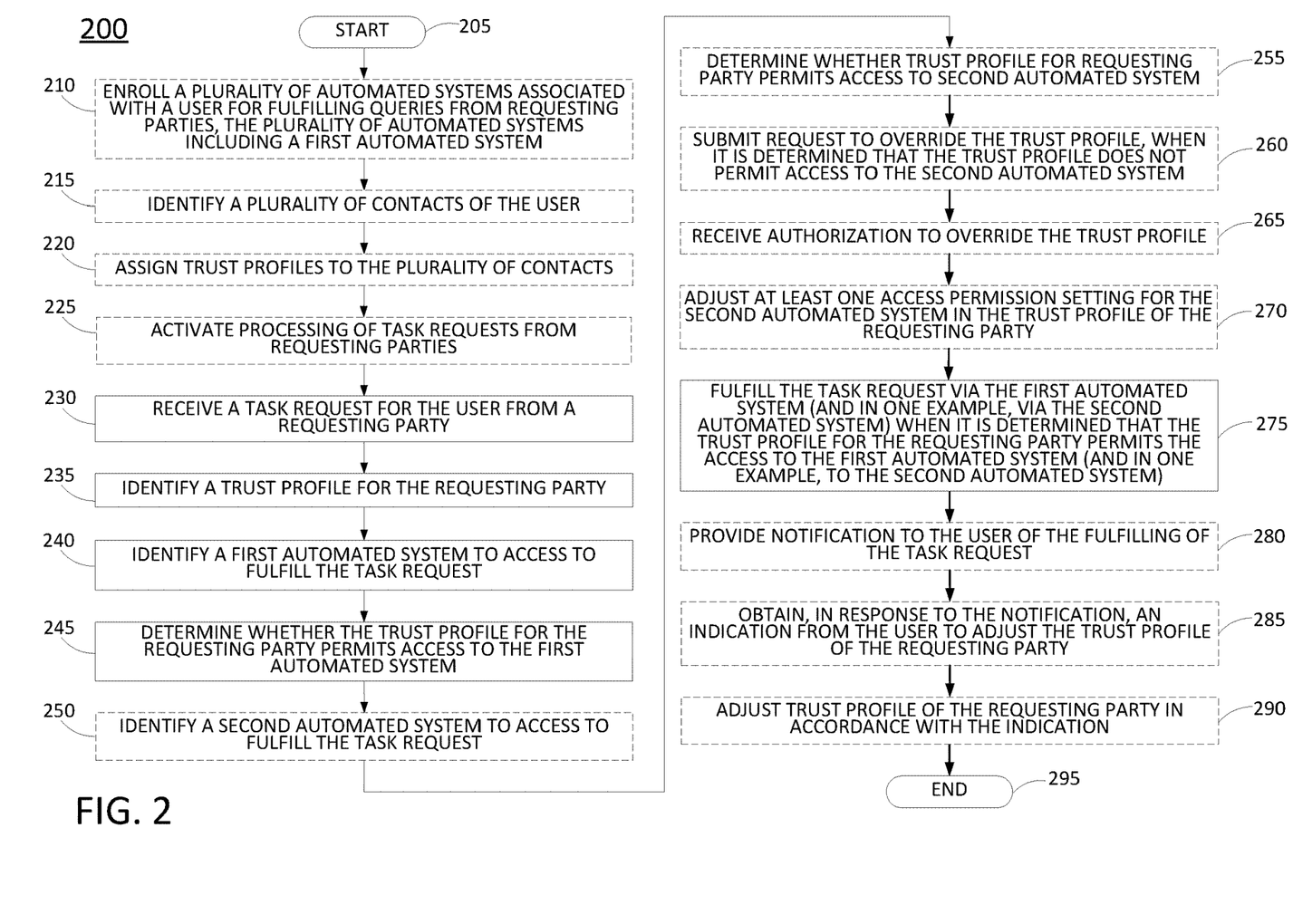
FIG. 2 illustrates an example flowchart of a method for fulfilling a task request for a user from a requesting party.

FIG. 2 illustrates an example flowchart of a method 200 for fulfilling a task request for a user from a requesting party. In one example, steps, functions and/or operations of the method 200 may be performed by a device as illustrated in FIG. 1, e.g., application server 135, one of endpoint devices 111-113 or 121-123, etc. Alternatively, or in addition, the steps, functions and/or operations of the method 200 may be performed by a processing system collectively comprising a plurality of devices as illustrated in FIG. 1, such as application server 135, endpoint devices 111-113 and/or 121-123, and so forth. In one example, the steps, functions, or operations of method 200 may be performed by a computing device or system 300, and/or a processing system 302 as described in connection with FIG. 3 below. For instance, the computing device 300 may represent at least a portion of a server, an application server, an endpoint device, and so forth, in accordance with the present disclosure. For illustrative purposes, the method 200 is described in greater detail below in connection with an example performed by a processing system, such as processing system 302. The method 200 begins in step 205 and proceeds to step 210.

At optional step 210, the processing system may enroll a plurality of automated systems associated with the user for fulfilling queries from requesting parties, the plurality of automated systems including a first automated system. In one example, optional step 210 may include the user giving tokens/keys, access codes, passwords, or the like, for accessing each automated system. In one example, optional step 210 may include the processing system obtaining access in accordance with a user request that the plurality of automated systems grant access to the processing system. For instance, the user may identify the processing system using a public key, where the processing system possesses the private key. Thus, each of the plurality of automated systems may positively identify the processing system if and when the processing system attempts to access a respective one of the automated systems on behalf of the user.

In one example, an automated system may include a device or a plurality of devices, may comprise a software application running on one or more devices, may comprise a data storage system, or may comprise a hybrid of the foregoing categories. For instance, the automated systems may include at least a first automated system comprising: a calendar system, a contact management system, a banking system, a computing system (e.g., a personal computing device, server, and/or cloud computing platform with user interfaces, programs/applications, etc.), a communication system (e.g., a home phone system, a softphone, a wireless router, a cable TV, VOD and/or DVR system, etc.), a smart building system (such as a thermostat, a humidistat, a door lock, a window lock, etc.), a biometric measurement system, a document management system, a location information system (e.g., a GPS unit, a location database maintained by a telecommunication service provider, etc.), a vehicle (and/or an in-vehicle communication system), and so on.

At optional step 215, the processing system may identify a plurality of contacts of a user. For example, the processing system may query for contacts of the user from the user's contact list(s), phone calls, text messages, emails, social media service(s), and so forth in accordance with the consent of the user. For instance, the processing system may request such information from one or more devices of the user, from a telecommunication service provider, from a social network service provider, and so on. Alternatively, or in addition, the processing system may determine contacts of the user via manual input from the user, e.g., in response to prompts from the processing system via a virtual assistant application operating on a device of the user.

At optional step 220, the processing system may assign trust profiles to the plurality of contacts. In one example, the trust profiles are assigned in accordance with selections by the user of trust profiles from a plurality of available trust profiles. For instance, the processing system may assist the user in creating customized trust profiles for each of the contacts, or can start with default trust profiles which can optionally be customized thereafter. In one example, the trust profiles are assigned based upon relationships between the user and the plurality of contacts. In addition, in one example, default trust profiles may be assigned based upon the types of relationships and how other users typically set trust profiles for their respective contacts having the same types of relationships. For example only, users may typically or on average provide a certain level of trust to spouses, a second level of trust to children, a third level of trust to friends, a fourth level of trust to extended family, etc. Thus, the default trust profiles may be selected in this manner.

In one example, each of the trust profiles comprises access permission settings for a plurality of automated systems. For instance, the access permission settings can be access/no access, access with specific access to certain data, functionality, and/or features of an automated system, and so forth. In one example, access permission settings may be on a per-automated system basis, and can be further refined by context, e.g., access/no access for a requesting party depending upon the time of day, the location of the user, the location of the requesting party, a biometric state of the user or the requesting party, a number of queries from the requesting party and/or a plurality of requesting parties (e.g., in a given time period, with regard to the same automated system(s), etc.), a presence of others with the requesting party (e.g., allow a child with a new driver's license to access a vehicle if the child is alone, but not if the child is with any friends), and so on.

In one example, the processing system may also learn context-dependent access permission settings on a per-trust profile basis and/or on a per-requesting party basis, on a per-automated system-basis (e.g., applying context-dependent change(s)/update(s) of access permission setting(s) for all requesting users and/or all trust profiles regarding a particular automated system), and so on. Alternatively, or in addition, the user may instruct the processing system by manually configuring context dependencies in the access permission setting(s) of trust profiles for specific contacts, for a plurality of selected contacts (who may or may not have a same trust profile), for those sharing a trust profile, for those having a same relationship type with the user, and so on.

At optional step 225, the processing system may activate the processing of queries from requesting parties. In one example, the activating is in response to an input from the user. In another example, the activating is in response to detecting a context of the user indicating that the user is unavailable. Context information may be determined from some of the same automated systems that may be implicated in a task request and which may be enrolled by the user at optional step 210, such as a calendar system, a biometric system, a vehicle, etc. Context information may also come from the user's mobile computing device (e.g., indicating that user is moving/driving, on a call, put in overnight/silent mode, etc.).

At step 230, the processing system receives a task request for a user from a requesting party. In one example, the task request comprises a request to perform at least one action via the first automated system. For instance, the action may comprise: opening a door, locking or unlocking a door or window, starting a device and/or permitting continued operation and/or control of the device for the requesting party, starting a software application and/or permitting continued operation of the software application for the requesting party, scheduling a meeting, establishing a call, starting a media program, reconfiguring a computing device, communication link/connection, or computing network, making a purchase or payment, and so forth. In one example, the task request comprises a query for information associated with the user. In other words, the associated action may be retrieving the information for the requesting party. For instance, the task request may be for a file comprising a document, a photograph or video, an application or program, and so forth. In one example, the task request may be for obtaining a token/key, password, or the like for banking access, email access, telecommunications service account access, or computing device access. In another example, the task request may be for obtaining bank account information, credit card information, or the like, biometric information of the user, demographic, income, employment, and/or housing information of the user, and so forth. It should be noted that the requesting party can be a person or can be another virtual assistant acting on behalf of another person or entity. In addition, the task request may be received in any number of formats, such as a text message, an email, a voice message or interactive voice response via a dialog presented to the requesting party by the processing system, and so on.

At optional step 235, the processing system identifies a trust profile for the requesting party. In one example, the requesting party comprises one of the plurality of contacts of the user and the trust profile for the requesting party is identified from the trust profiles assigned to the plurality of contacts. In one example, the requesting party may be unknown to the user or may have an unassigned trust profile, and the processing system may select a default trust profile for the unknown party at optional step 235.

At step 240, the processing system identifies a first automated system to access to fulfill the task request. In an example where the task requests comprises a request for information of the user, the processing system may maintain a mapping of types of information to associated automated systems. In one example, the types of available information for the user from each automated system may be cataloged when the automated systems are enrolled at optional step 210. As such, in one example, step 240 may comprise mapping the type(s) of information being requested in the task request to the automated system(s) (e.g., including at least the first automated system) that may possess or that may be able to provide such information. In another example, the task request may comprise access to a location, a system or the like. Thus, the nature of the task request may explicitly indicate the automated system to which the user is requesting access. For instance, the task request may comprise a request to open a door, which may be directly mapped to an automated door lock in a catalog of automated systems associated with the user that is maintained by or accessible to the processing system.

At step 245, the processing system determines whether the trust profile for the requesting party permits access to the first automated system. For instance, as described above, the trust profile may include different permissions to access information or perform other actions relating to different automated systems that may be enrolled by the user, and may specify different contexts for such permissions. In one example, the processing system may gather context information from various devices and systems on an ongoing basis. Alternatively, or in addition, the processing system may obtain context information from one or more devices or systems in response to receiving the task request at step 230.

At step 250, the processing system may identify a second automated system to access to fulfill the task request. For example, optional step 250 may comprise the same or similar operations as step 240 above. In addition, in one example, a task request may involve a request to perform a more involved task that may include several sub-tasks. In such case, the processing system may run a sub-task determination algorithm to determine if an overall task may be broken down into a plurality of sub-tasks. The processing system may also assign any sub-tasks identified to appropriate automated systems for execution. In such case, each of the automated systems (e.g., including at least the first automated system) may be identified. As just one example, a child may send a task request to a parent for being picked up at home and being dropped off at a friend's house, which may be intercepted by the processing system. To fulfill the task request, the processing system may determine that access to a self-driving car (e.g., a first automated system) is required, and may further determine that access to an automated gate of the driveway at the family's home (e.g., a second automated system) is also required.

At optional step 255, the processing system may determine whether the trust profile for the requesting party permits access to the second automated system. For example, optional step 255 may comprise the same or similar operations as step 245 above. For instance, the task request may involve access to more than one automated system in order to fulfill the task request. However, there may be separate settings for the requesting party's ability to access the first automated system and the second automated system in accordance with the requesting party's trust profile.

At optional step 260, the processing system may submit a request to override the trust profile, when it is determined that the trust profile for the requesting party does not permit access to the second automated system. In one example, the option to override could be valid for 30 seconds, 5 minutes, etc. In one example, the time period can be set by the user and can be the same or different for different contacts/requesting parties, can be different for different automated systems that may be accessed in connection with a task request, and so on. In one example, the request may comprise a non-obtrusive notification to the user and/or one or more live proxies, such as a text message or an application alert.

At optional step 265, the processing system may receive an authorization to override the trust profile. In one example, a request to override can be sent to and the authorization received from the user. In one example, the request to override can be sent to and the authorization received from a proxy of the user (e.g., a spouse or other designated parties). In another example, the request can be sent to the user first and if no response is received, then the request is sent to the proxy. In addition, the user may designate multiple proxies and may configure the processing system to follow an order of contact or to simultaneously contact all proxies, where the processing system may accept a response from the first proxy to respond.

At optional step 270, the processing system may adjust at least one access permission setting for the second automated system in the trust profile of the requesting party. For example, in response to the authorization, or in response to multiple authorizations for the same requesting party or for other requesting parties with the same trust profile and/or same relationship type, the processing system may increase the trust profile of the requesting party to a next more permissive trust profile (e.g., from a set of available trust profiles). In another example, the processing system may change a trust level in the trust profile with respect to accessing the automated system for the requesting party. For instance, the processing system may learn over time that a certain requesting party or class of requesting parties are often requesting access to the same automated system(s) and that the user is always/often granting such access. When this occurs a threshold number of times for the same requesting party or plurality of requesting parties, the processing system may determine that the requesting party and/or parties should be granted access to the automated system(s) without having to obtain a specific authorization from the user every time.

At step 275, the processing system may fulfill the task request via the first automated system when it is determined that the trust profile for the requesting party permits the access to the first automated system. In one example, the fulfilling the task request is via the first automated system and via the second automated system in accordance with the authorization received at optional step 265. For instance, step 275 may include performing a first action via the first automated system and an additional action via the second automated system, or obtaining additional information from the second automated system and fulfilling a query in accordance with the additional information.

In an example where the task request comprises a query for information associated with the user, the fulfilling the task request may comprise obtaining the information from the first automated system (and in one example, from the second automated system) when it is determined that the trust profile for the requesting party permits the access to the first automated system (and in one example, to the second automated system) and fulfilling the query for the requesting party in accordance with the information that is obtained. In another example, fulfilling the task request may comprise answering a question based upon the information obtained from the first automated system (and in one example, from the second automated system). This option may better protect the privacy of the user by withholding details of the information that is not required to be possessed by the requesting party in order to meet requesting party's needs.

Alternatively, or in addition, the fulfilling the task request may include performing one or more specifically requested actions, or performing one or more actions determined in accordance with the task request. For instance, as stated above, the action(s) may include opening a door, locking or unlocking a door or window, starting a device and/or permitting continued operation and/or control of the device for the requesting party, starting a software application and/or permitting continued operation of the software application for the requesting party, scheduling a meeting, establishing a call, starting a media program, reconfiguring a computing device, communication link/connection, or computing network, making a purchase or payment, and so forth.

At optional step 280, the processing system may provide a notification to the user of the fulfilling of the task request. In one example, the notification may comprise a non-obtrusive notification to the user, such as a text message or an application alert. In one example, the user may obtain the notification when the user exits a do-not-disturb situation and/or at the next time the user accesses a virtual assistant application.

At optional step 285, the processing system may obtain, in response to the notification, an indication from the user to adjust the trust profile of the requesting party. For instance, for each task request, the user may audit the decision of the processing system (e.g., the virtual assistant) and may provide feedback regarding whether the action was desirable or undesirable. In one example, the user may audit the decision making of the processing system (e.g., the virtual assistant), and may separately indicate to the processing system to reconfigure the trust profile and/or the access permissions within the trust profile for the requesting party at a same time or at a later time. In other words, the user may request such a change without a specific prompt or dialog from the processing system.

At optional step 290, the processing system may adjust the trust profile of the requesting party in accordance with the indication. For instance, the processing system may change the trust profile for the requesting party to a different standard/default trust profile with a higher or lower overall level of trust (e.g., with access to more or less automated systems, more or less access to certain data, functionality, and/or features of the first automated system, and so on). In one example, for an undesirable granting of access (and fulfillment of a task request), the processing system may lower the trust level for at least the first automated system within the trust profile of the requesting party. For instance, the user may have provided feedback at optional step 285 indicating an undesirable decision. Similarly, for an undesirable denial of access (and non-fulfillment of a task request), the processing system may raise the trust level for at least the first automated system within the trust profile of the requesting party. In another example, optional step 290 may comprise the processing system changing the trust profile in response to a manual request from the user received at optional step 285.

Following step 275, or any of optional steps 280-290, the method 200 proceeds to step 295 where the method 200 ends. It should be noted that the method 200 may be expanded to include additional steps or may be modified to include additional operations with respect to the steps outlined above. For instance, the method 200 may be expanded to include providing a notification to the user of an intent to fulfill the task request for the requesting party. The notification may comprise/include an override offer to the user to prevent the processing system from fulfilling the task request for the requesting party. In one example, the method 200 may be expanded to include enrolling a new contact and creating/assigning a trust profile to the new contact. The method may 200 also be expanded to include a supervisor or auditor override for specific authorizations or denials of access to automated systems, for changes to trust profiles and/or access permission settings, and so on. For instance, the supervisor or auditor can revoke an authorization after grant, e.g., allowing ongoing monitoring for misuse of information or misuse of access to a device, a location, a service, and so forth after or in connection with the fulfilling of the task request. In still another example, the method 200 may include repeating the steps 230-275 for subsequent task requests from the same requesting party or one or more other requesting parties. Thus, these and other modifications are all contemplated within the scope of the present disclosure.

In addition, although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted either on the device executing the method 200, or to another device, as required for a particular application. Furthermore, steps, blocks, functions, or operations in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for fulfilling a task request for a user from a requesting party, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for fulfilling a task request for a user from a requesting party (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for fulfilling a task request for a user from a requesting party (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
receiving, by a processing system including at least one processor, a task request for a user of the processing system from a requesting party, wherein the requesting party is a party other than the user, and wherein the user is unavailable to respond to the task request when the task request is received;
identifying, by the processing system, a trust profile for the requesting party, wherein the trust profile specifies conditions under which the requesting party is permitted to access information and perform actions relating to a plurality of automated systems that is accessible to the processing system;
identifying, by the processing system, a first automated system to access to fulfill the task request, wherein the first automated system is one of the plurality of automated systems, and wherein the trust profile is separate from the first automated system;
determining, by the processing system, that the trust profile for the requesting party permits an access to the first automated system;
identifying, by the processing system, a second automated system to access to fulfill the task request, wherein the second automated system is one of the plurality of automated systems, and wherein access credentials are needed to access the second automated system;
determining, by the processing system, that the trust profile for the requesting party does not permit an access to the access credentials needed to access the second automated system;
submitting, by the processing system in response to the determining that the trust profile for the requesting party does not permit the access to the second automated system, a request to override the trust profile; and
fulfilling, by the processing system in response to the determining that the trust profile for the requesting party permits the access to the first automated system and a grant of an authorization to override the trust profile in response to the request to override the trust profile, the task request on behalf of the user via the first automated system and the second automated system, wherein the grant of the authorization to override the trust profile grants the access to the second automated system without exposing the access credentials to the requesting party.

2. The method of claim 1, wherein the task request comprises a request to perform at least one action via the first automated system.

3. The method of claim 1, wherein the task request comprises a query for information associated with the user, wherein the fulfilling the task request comprises:
obtaining, by the processing system, the information from the first automated system when it is determined that the trust profile for the requesting party permits the access to the first automated system; and
fulfilling, by the processing system, the query for the requesting party in accordance with the information that is obtained from the first automated system.

4. The method of claim 1, further comprising:
identifying, by the processing system, a plurality of contacts of the user; and
assigning, by the processing system, trust profiles to the plurality of contacts.

5. The method of claim 4, wherein the trust profiles are assigned from a plurality of available trust profiles.

6. The method of claim 4, wherein the trust profiles are assigned based upon relationships between the user and the plurality of contacts.

7. The method of claim 4, wherein the requesting party comprises one of the plurality of contacts of the user, wherein the trust profile for the requesting party is identified from the trust profiles assigned to the plurality of contacts.

8. The method of claim 4, wherein each of the trust profiles comprises access permission settings for the plurality of automated systems.

9. The method of claim 1, further comprising:
activating, by the processing system, a processing of task requests from requesting parties on behalf of the user prior to the receiving of the task request, wherein the activating is performed in response to a determination that the user is unavailable to respond to the task requests.

10. The method of claim 9, wherein the determination is made in response to an input from the user indicating that the user is unavailable to respond to the task requests.

11. The method of claim 9, wherein the determination is made in response to detecting a context of the user indicating that the user is unavailable to respond to the task requests.

12. The method of claim 1, further comprising:
enrolling, by the processing system, the plurality of automated systems for fulfilling queries from requesting parties prior to the receiving of the task request.

13. The method of claim 1, wherein the first automated system comprises:
a calendar system;
a contact management system;
a banking system;
a computing system;
a smart building system;

a biometric measurement system;
a document management system;
a location information system; or
a vehicle.

14. The method of claim 1, further comprising:
providing, by the processing system, a notification to the user of the fulfilling of the task request; and
obtaining, by the processing system in response to the notification, an indication from the user to adjust the trust profile of the requesting party.

15. The method of claim 14, further comprising:
adjusting, by the processing system, the trust profile of the requesting party in accordance with the indication.

16. The method of claim 1, further comprising:
receiving, by the processing system, the authorization to override the trust profile, wherein the fulfilling the task request is via the first automated system and via the second automated system in accordance with the authorization.

17. The method of claim 16, further comprising:
adjusting, by the processing system, at least one access permission setting for the second automated system in the trust profile of the requesting party.

18. The method of claim 1, wherein the access credentials comprise a password needed to access the second automated system.

19. A non-transitory computer-readable storage medium storing instructions which, when executed by a processing system including at least one processor, cause the processing system to perform operations, the operations comprising:
receiving a task request for a user of the processing system from a requesting party, wherein the requesting party is a party other than the user, and wherein the user is unavailable to respond to the task request when the task request is received;
identifying a trust profile for the requesting party, wherein the trust profile specifies conditions under which the requesting party is permitted to access information and perform actions relating to a plurality of automated systems that is accessible to the processing system;
identifying a first automated system to access to fulfill the task request, wherein the first automated system is one of the plurality of automated systems, and wherein the trust profile is separate from the first automated system;
determining that the trust profile for the requesting party permits an access to the first automated system;
identifying a second automated system to access to fulfill the task request, wherein the second automated system is one of the plurality of automated systems, and wherein access credentials are needed to access the second automated system;
determining that the trust profile for the requesting party does not permit an access to the access credentials needed to access the second automated system;
submitting, in response to the determining that the trust profile for the requesting party does not permit the access to the second automated system, a request to override the trust profile; and
fulfilling, in response to the determining that the trust profile for the requesting party permits the access to the first automated system and a grant of an authorization to override the trust profile in response to the request to override the trust profile, the task request on behalf of the user via the first automated system and the second automated system, wherein the grant of the authorization to override the trust profile grants the access to the second automated system without exposing access credentials needed to access the second automated system to the requesting party.

20. A device comprising:
a processing system including at least one processor; and
a non-transitory computer-readable medium storing instructions which, when executed by the processing system, cause the processing system to perform operations, the operations comprising:
receiving a task request for a user of the processing system from a requesting party, wherein the requesting party is a party other than the user, and wherein the user is unavailable to respond to the task request when the task request is received;
identifying a trust profile for the requesting party, wherein the trust profile specifies conditions under which the requesting party is permitted to access information and perform actions relating to a plurality of automated systems that is accessible to the processing system;
identifying a first automated system to access to fulfill the task request, wherein the first automated system is one of the plurality of automated systems, and wherein the trust profile is separate from the first automated system;
determining that the trust profile for the requesting party permits an access to the first automated system;
identifying a second automated system to access to fulfill the task request, wherein the second automated system is one of the plurality of automated systems, and wherein access credentials are needed to access the second automated system;
determining that the trust profile for the requesting party does not permit an access to the access credentials needed to access the second automated system;
submitting, in response to the determining that the trust profile for the requesting party does not permit the access to the second automated system, a request to override the trust profile; and
fulfilling, in response to the determining that the trust profile for the requesting party permits the access to the first automated system and a grant of an authorization to override the trust profile in response to the request to override the trust profile, the task request on behalf of the user via the first automated system and the second automated system, wherein the grant of the authorization to override the trust profile grants the access to the second automated system without exposing access credentials needed to access the second automated system to the requesting party.

* * * * *